Nov. 12, 1963        D. BENESCH                3,110,127
SINGLE LINE CONTROL SYSTEM FOR MODEL AIRCRAFT
Filed Jan. 13, 1961                           2 Sheets-Sheet 1
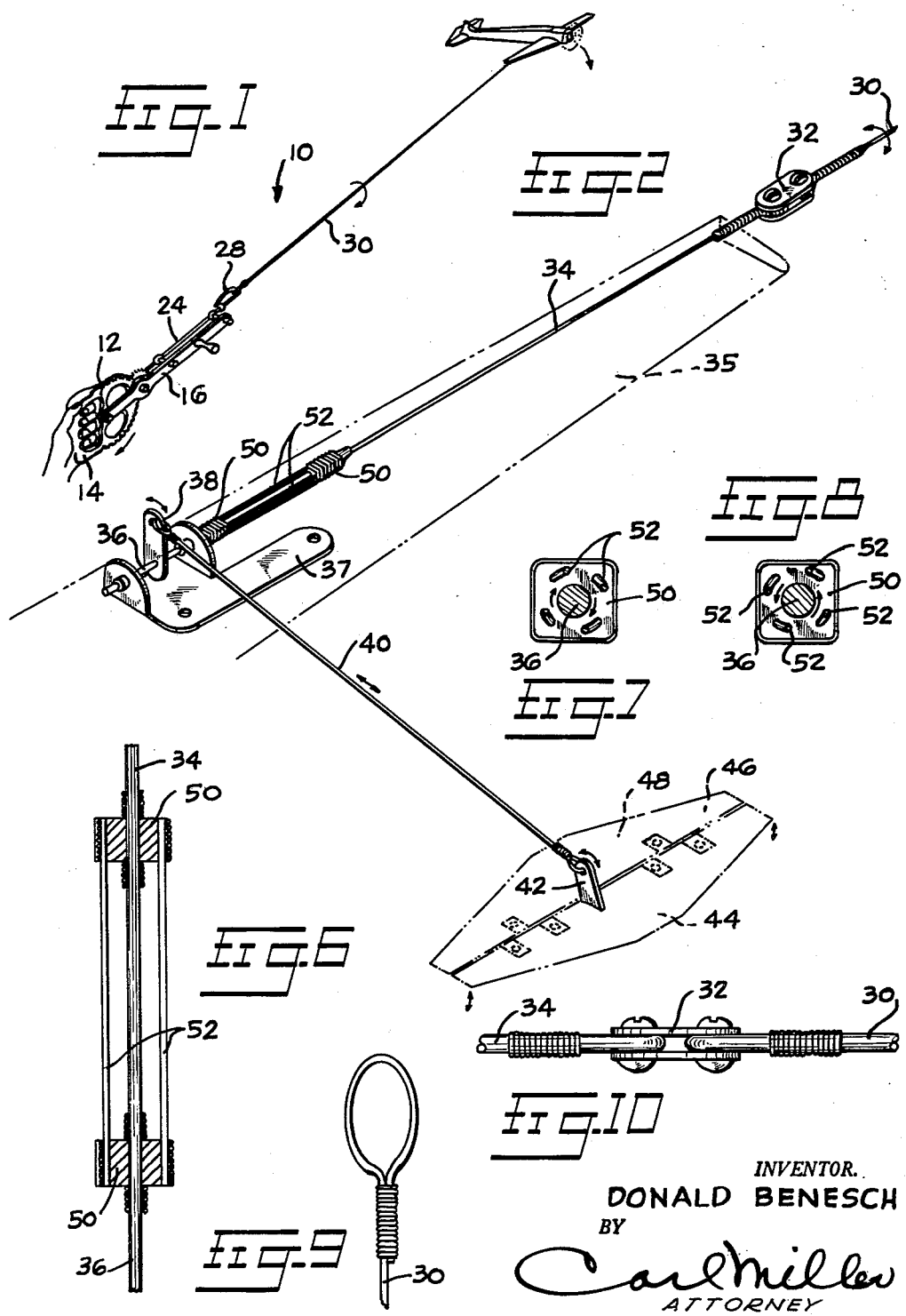
INVENTOR.
DONALD BENESCH
BY
Carl Miller
ATTORNEY

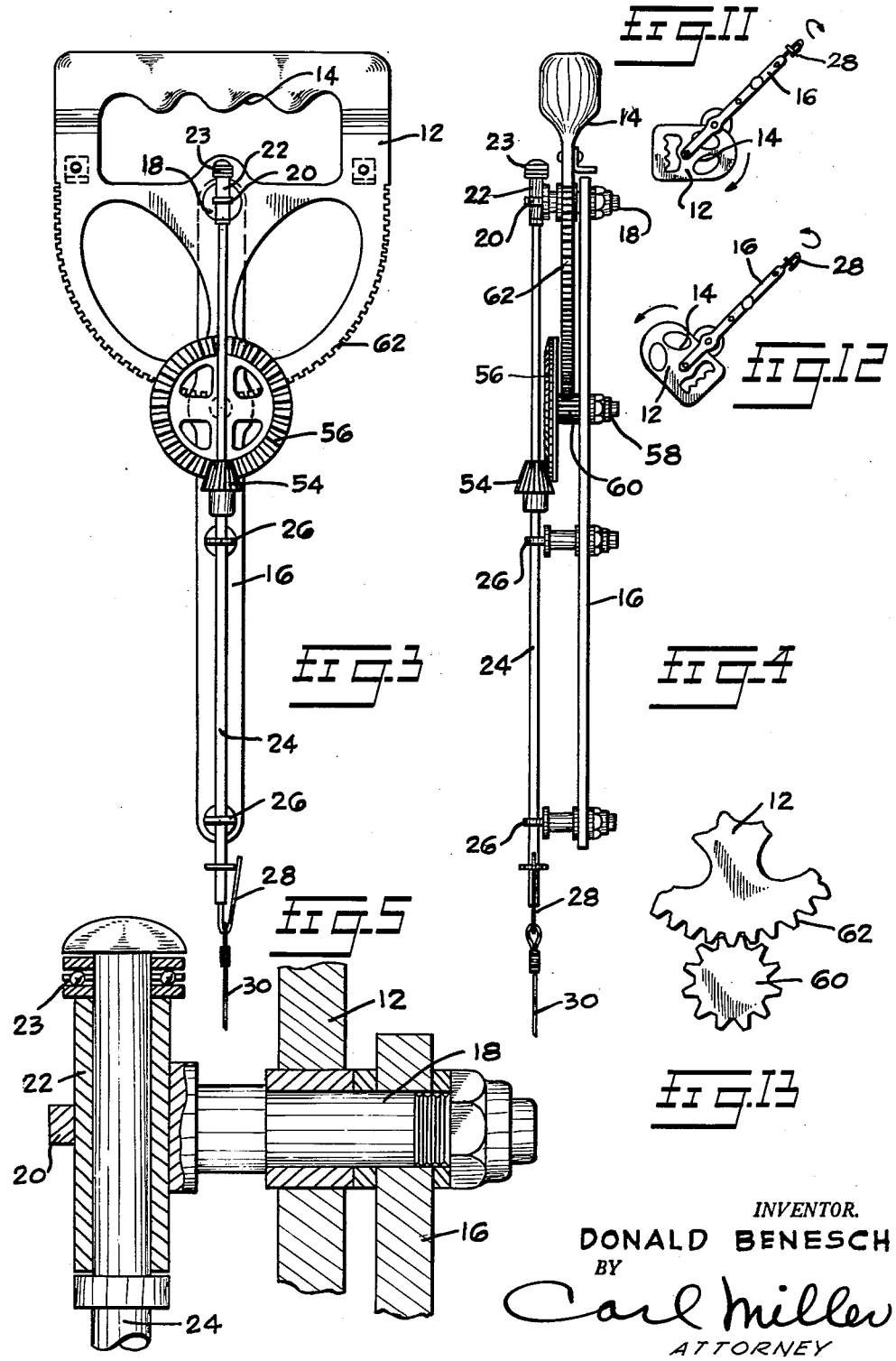

United States Patent Office 3,110,127
Patented Nov. 12, 1963

1

3,110,127
SINGLE LINE CONTROL SYSTEM FOR
MODEL AIRCRAFT
Donald Benesch, 4319 39th Place, Long Island City, N.Y.
Filed Jan. 13, 1961, Ser. No. 82,474
1 Claim. (Cl. 46—77)

This invention relates to model aircraft and, more particularly, to a single line control system therefor.

It is an object of the present invention to provide a single line control system for directing a model aircraft in flight and for adjusting the elevated controls thereof.

A further object of the present invention is to provide a single line control system of the aforementioned type which is operated by a single hand during flight of the model aircraft.

An additional object of the present invention is to provide a single line control system for model aircraft which can be readily used for all types of model aircraft, easily installed, and substantially foolproof in operation.

All of the foregoing and still further objects and advantages of this invention will become apparent from a study of the following specification, taken in connection with the accompanying drawing, wherein:

FIGURE 1 is a perspective view of a single line control system from model aircraft made in accordance with the present invention in actual use;

FIGURE 2 is an enlarged fragmentary perspective view of certain actuated elements of the present invention as installed within a model aircraft;

FIGURE 3 is a front plan view of a handle assembly forming the main operating parts of the present invention;

FIGURE 4 is a side elevational view of the assembly shown in FIGURE 3;

FIGURE 5 is an enlarged fragmentary cross sectional view of certain bearing portions of the device shown in FIGURES 3 and 4;

FIGURE 6 is an enlarged fragmentary cross sectional view of a twist spring assembly forming a part of the present invention;

FIGURE 7 is an end view of the assembly shown in FIGURE 6 in one position of adjustment;

FIGURE 8 is a view similar to FIGURE 7, in another position of adjustment;

FIGURE 9 is an enlarged fragmentary plan view of one end of a control cable for attachment to the hand control assembly;

FIGURE 10 is a fragmentary side elevational view of a coupling member forming another part of the present invention;

FIGURE 11 is a diagrammatic plan view of the device shown in FIGURES 3 and 4 in one adjusted position;

FIGURE 12 is a view similar to FIGURE 11 in another adjusted position; and

FIGURE 13 is an enlarged fragmentary plan view of certain gear elements forming a part of the present invention.

Referring now to the drawing, a single line control system made in accordance with the present invention for use with model aircraft of all types is shown to include an assembly of parts 10 which is manually operated at one end for controlling the movement of linkage at the opposite end mounted upon the model aircraft in flight.

2

The hand control unit includes a handle 12 having a hand grip 14 that is rotatably supported upon one end of a main plate 16 by means of a pivot pin 18 having a ferrule 20 through which a terminal 22 of a main shaft 24 is received. A thrust bearing 23 acting between the terminal 22 and the shaft 24, facilitates rotation of the shaft 24 about its longitudinal axis upon the plate 16. A pair of longitudinally spaced apart additional ferrules 26 mounted upon the plate 16 guide the shaft 24 for such rotational movement, for purposes hereinafter more fully described. One end of the shaft 24 is provided with a hook type fitting 28 for engaging one end of a flexible model aircraft tie line cable 30 which has a coupling 32 at its opposite end for connection to a control shaft 34 mounted within the wing 35 of the model aircraft.

The control rod 34 is connected to a rocker shaft 36 mounted upon a bracket 37 located centrally within the wing 35 by means of a twist spring assembly more clearly shown in FIGURES 6 to 8.

The twist spring assembly includes a pair of longitudinally spaced apart mounting blocks 50 secured upon the innermost end of the control rod 34 adjacent to the rocker shaft 36, which blocks 50 have a plurality of longitudinally extending spring wires 52 which torsionally transmit rotational movement of the cable 30 and control rod 34 to the rocker shaft 36. Rotation of the rocker shaft 36 is transmitted to a link 38 mounted thereupon which has a control cable 40 connected at one end to the outermost end thereof and the opposite end to an upstanding lug 42 mounted upon the elevator 44 of the aircraft which is pivotally supported by hinges 46 upon the elevator stabilizer 48.

Referring now specifically to FIGURES 3 and 4 of the drawing, the control shaft 24 is shown to also include a bevel gear 54 mounted thereupon in meshing engagement with a bevel spur gear 56 rotatably carried by a shaft 58 mounted upon the main plate 16. Also mounted upon this shaft 58 is a pinion 60 in meshing engagement with a gear segment 62 formed upon the handle 12 at the end opposite the hand grip 14. It will thus be recognized that with the aircraft in flight, an outward pull is exerted upon the cable 30, thus maintaining the control plate 16 in substantial alignment therewith. As a result, rotation of the handle 16 about its shaft mounting 18 upon the plate 16, is operative to effect rotation of the shaft 24 about its longitudinal axis through the transmission of power from the handle 12 through the gear train to the bevel gear 54 secured upon the shaft 24. Such rotation of the shaft 24 imparts a similar rotation to the cable 30, control rod 34, rocker shaft 36, and ultimately adjusts the position of the elevator 44 relative to the aircraft to adjust the flight path of the captive aircraft.

It will thus be recognized that an extremely, easily controlled, and foolproof system has been provided for a single line control of model aircraft in flight.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

A single line control system for model aircraft, comprising an elongated main plate, a main shaft supported on said main plate and being rotatable on an axis substantially parallel to said plate, a torsion resistant cable connected at one end to one end of said main shaft and to be connected to a coupling at its other end, an elevator control mechanism having a coupling connected to the other end of said cable, a handle centrally and pivotally mounted on said main plate for rotation on an axis substantially normal to said main plate and transverse to the axis of rotation of said main shaft, said handle having a hand grip portion disposed on one side of the handle pivot connection and a sector gear portion on the opposite side thereof, a gear fixed to the end of said shaft opposite from said cable, and idler gear means rotatably mounted on said main plate in mesh with said sector gear portion and the gear fixed to the main shaft end for rotating the main shaft when the handle is rotated relative to the main plate.

References Cited in the file of this patent
UNITED STATES PATENTS

| | | |
|---|---|---|
| 2,558,109 | Stanzel | June 26, 1951 |
| 2,616,214 | Hydrick | Nov. 4, 1952 |